(12) United States Patent
Krause et al.

(10) Patent No.: US 8,231,275 B2
(45) Date of Patent: Jul. 31, 2012

(54) SLIDE BEARING BUSH

(75) Inventors: Thomas Krause, Grafenrheinfeld (DE);
Burkard Beck, Unterpleichfeld (DE);
Peter Schmehr, Grettstadt (DE)

(73) Assignee: Aktiebolaget SKF, Gothenburg (SE)

( * ) Notice: Subject to any disclaimer, the term of this patent is extended or adjusted under 35 U.S.C. 154(b) by 756 days.

(21) Appl. No.: 12/180,151

(22) Filed: Jul. 25, 2008

(65) Prior Publication Data

US 2009/0028480 A1   Jan. 29, 2009

(30) Foreign Application Priority Data

Jul. 25, 2007 (DE) .................. 10 2007 034 536

(51) Int. Cl.
*F16C 17/00* (2006.01)
*F16C 33/74* (2006.01)
*F16C 33/02* (2006.01)
(52) U.S. Cl. .................. 384/129; 384/152; 384/295
(58) Field of Classification Search .................. 384/15, 384/16, 129, 130, 275, 295, 296, 147–152; 403/329, 397, DIG. 14
See application file for complete search history.

(56) References Cited

U.S. PATENT DOCUMENTS

| | | | | |
|---|---|---|---|---|
| 3,725,973 A | * | 4/1973 | Gwozdz | ............ 16/273 |
| 3,951,234 A | | 4/1976 | Fisher | |
| 4,874,349 A | | 10/1989 | Gall | |
| 5,172,984 A | | 12/1992 | Lederman | |
| 5,678,953 A | * | 10/1997 | Usui et al. | ............ 403/329 |
| 6,082,902 A | * | 7/2000 | Muehlpforte et al. | ........ 384/129 |

FOREIGN PATENT DOCUMENTS

| | | |
|---|---|---|
| AT | 334 832 B | 2/1976 |
| DE | 30 13 435 A1 | 5/1982 |
| DE | 87 03 962 U1 | 6/1987 |
| DE | 38 52 479 T2 | 5/1995 |
| DE | 199 09 922 A1 | 9/2000 |
| DE | 10 2004 037 202 A1 | 3/2006 |
| FR | 1 472 811 A | 3/1967 |
| JP | 09-166 147 A | 6/1997 |
| WO | WO 2006/013022 A1 | 2/2006 |

* cited by examiner

*Primary Examiner* — Thomas R Hannon
*Assistant Examiner* — Phillip A Johnson
(74) *Attorney, Agent, or Firm* — Buchanan, Ingersoll & Rooney PC

(57) ABSTRACT

A slide bearing bush with an integrated sealing element permits a relatively simple and economical production of the slide bearing bush. The slide bearing bush includes a bush part and a cover part. The bush part and/or the cover part is provided with an annular groove formed for holding the sealing element, and the slide bearing bush comprised of the bush part and the cover part possesses a cylindrical outside contour.

10 Claims, 2 Drawing Sheets

US 8,231,275 B2

SLIDE BEARING BUSH

TECHNOLOGICAL FIELD

The invention generally relates to a slide bearing bush. More specifically, the invention relates to a slide bearing bush with an integrated sealing element.

BACKGROUND DISCUSSION

Examples of a slide bearing bush are disclosed in DE 199 09 922 A1 and DE 87 03 962 U1. In order to seal the slide bearing bush with its slide seat on a shaft in an axially end-side region, a sealing element is provided. To fix it in its position, the sealing element is secured axially with a cover-like component which is connected directly or indirectly to the bush-shaped base body of the slide bearing.

The slide bearing bush known from the aforementioned documents has a relatively complex structure and is thus expensive. Moreover, the unit consisting of the slide bearing bush and the sealing element does not have a cylindrical outside contour. This can pose problems with respect to installation engineering for many applications. In these applications, for the sake of simple mounting, it is advantageous for the slide bearing bush to have a fundamentally hollow-cylindrical shape and specifically a cylindrical outside surface.

This can be achieved by the slide bearing bush being produced from a hollow cylindrical, plastic base body into which, either during the injection molding process by folding cores or core pullers or after the injection molding process by mechanical working, an annular groove is formed into which the sealing element is inserted.

Thus, the desired, basic hollow-cylindrical shape of the slide bearing bush can be ensured, but the production cost is considerable and the slide bearing bush is thus expensive. The use of folding cores disadvantageously results in the injection molding tool which is made in this way is relatively susceptible to problems. Furthermore, in this case burrs can relatively easily form which are disadvantageous since they can destroy the gasket within a short time. The downstream cutting process to form the annular groove (by turning) is an additional step in which the slide bearing bush can be slightly damaged on the outside diameter when clamped in the machine tool.

SUMMARY

A slide bearing bush consists of a bush part and a cover part, and in the bush part and/or in the cover part an annular groove is formed for holding the sealing element. The slide bearing bush which consists of the bush part and cover part has an essentially cylindrical outside contour. The bush part and cover part moreover preferably also have a cylindrical inside contour.

At least, the bush part and preferably also the cover part consist of plastic. It is also possible, however, that the cover part consists of plastic and that the bush part consists of metal or a fiber composite or of a combination of these materials, optionally with further use of a plastic. The annular groove for the sealing element in a radial section preferably has a rectangular shape.

The bush part and the cover part can be interconnected by a snap connection. In this case, it has proven to be a good idea when on the cover part or on the bush part there are hook-shaped and axially extending projections which engage recesses which have an undercut in the bush part or in the cover part. The projections which are made hook-shaped in the mounted state of the slide bearing bush can form a component which is integrated into the cylindrical outside contour of the slide bearing bush. Furthermore, it can be provided that a number of hook-shaped projections are arranged around the periphery of the slide bearing bush. The hook-shaped projections can be spaced apart so as to be located equidistantly around the periphery.

Alternatively, it is advantageously possible for the bush part and the cover part to be interconnected by a screw connection. As another alternative, it can be provided that the bush part and the cover part are interconnected by an adhesive connection.

To fix the slide bearing bush a mounting flange can be provided on the cover part.

With this configuration, it is possible to relatively easily produce a slide bearing bush with a hollow cylindrical base contour which is simpler in design, which can be economically produced, and which has high quality. Burrs or other damage by metal cutting are generally precluded. Furthermore, conventional injection molding tools without folding cores or core pullers can be used.

Moreover, a modular structure of the slide bearing bush is possible; this can be achieved by a combination of identical bush parts with different cover parts.

According to another aspect, a slide bearing bush is mounted on a shaft, and the slide bearing bush comprises a bush part and a cover part. The bush part is provided with a through hole possessing an inner surface facing the outer periphery of the shaft. The bush part includes an annular groove, and the cover part is connected to the bush part so that a portion of the cover part bounds the annular groove and defines a wall of the annular groove. A sealing element is positioned in the annular groove, and the bush part and the cover part have a cylindrical outer contour. The cover part is connected to the bush part by a projection that engages a recess, the projection having an axially extending part and a radially extending part positioned in the recess.

BRIEF DESCRIPTION OF THE DRAWING FIGURES

The foregoing and additional details and aspects of the subject matter disclosed here will be described with reference to the accompanying drawing figures in which like elements are designated by like reference numerals.

DETAILED DESCRIPTION

Figure 1:
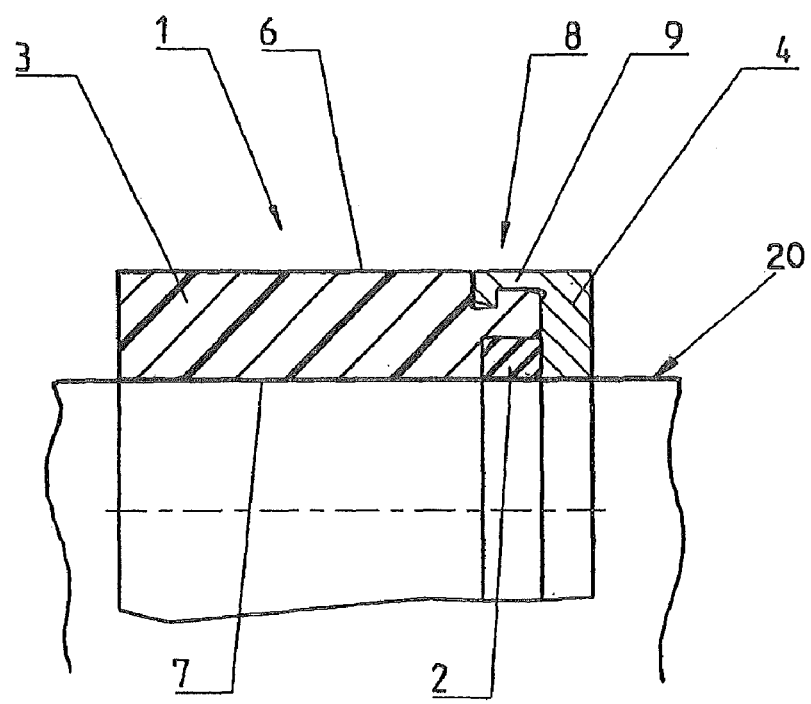
FIG. 1 is a schematical radial cross-sectional view through a slide bearing bush according to one disclosed embodiment.
Figure 2:
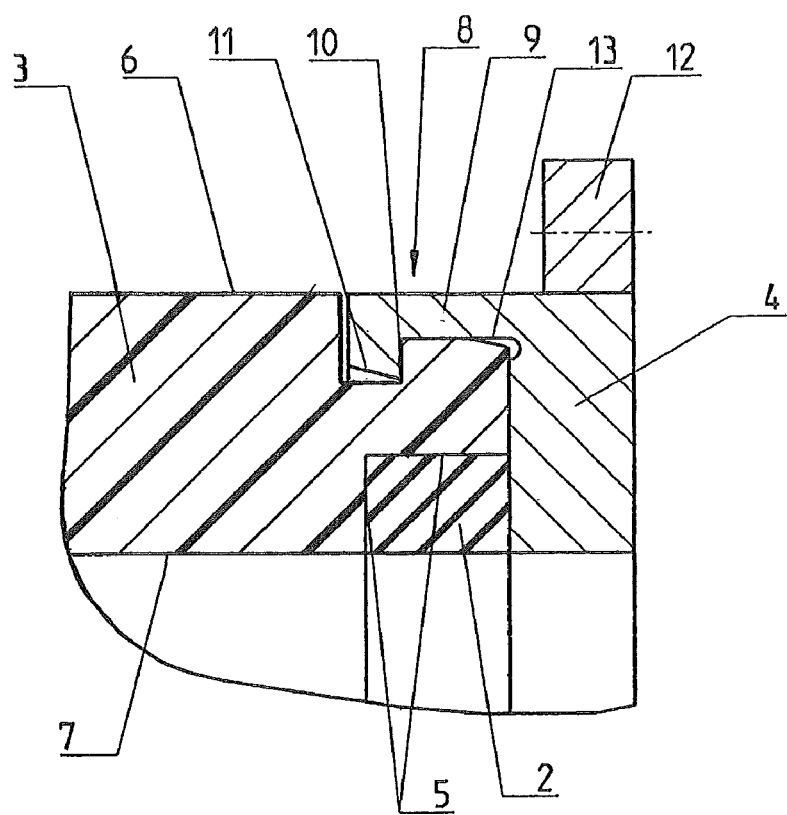
FIG. 2 is an enlarged cross-sectional view of the upper right region of the bush shown in FIG. 1.

FIGS. 1 and 2 illustrate a slide bearing bush 1 which has an integrated sealing element 2. The sealing element can be a radial packing ring which seals toward the shaft part (generally shown in FIG. 1 as 20). The sealing element 2 is located in an annular groove 5 which is positioned in the radially inside region near the axial end of the slide bearing bush 1.

The annular groove 5 for holding the sealing element 2 is formed by the slide bearing bush 1 being composed of two parts, specifically a bush part or sleeve part 3 possessing an essentially hollow cylindrical contour, and a cover part 4 attached in the axial end region of the bush part 3 and connected to the bush part 3.

As is shown especially in FIG. 1, shaping both the bush part 3 and the cover part 4 yields an altogether hollow cylindrical shape of the slide bearing bush 1, i.e. it has a cylindrical outside contour 7 and a cylindrical inside contour 8. According to a preferred embodiment, at least the sleeve part or bush part 3 consists of plastic. More preferably, both the sleeve part 3 and the cover part 4 consist of plastic. Alternatively, the cover part 4 can consist of plastic, while the bush part 3 consists of metal or a fiber composite or of a combination of these materials, optionally with further use of a plastic.

Thus, the slide bearing bush can be relatively easily installed in many applications.

In the illustrated embodiment, the recess forming the annular groove 5 is provided in the axial end region of the bush part 3. This is relatively easily accomplished by the injection molding process by which the plastic bush part is produced. If then the disk-shaped cover part 4 is axially joined to the bush part 3, the holding space for the sealing element 2, i.e. the annular groove 5, is formed. A portion of the cover part 4 bounds the annular groove 5 and defines a wall of the annular groove 5. In a preferred embodiment, the annular groove 5 receiving the sealing element 2 possesses a rectangular shape in radial cross-section, and the sealing element 2 is in contact with the cover part 4.

The strong bond or fixation of the bush part 3 and cover part 4 in this embodiment is created by a snap connection 8. This snap connection is formed by hook-shaped projections 9 which are located on the cover part 4 (e.g., integrally formed in one piece as a part of the cover part 4) and recesses 11 which, in this embodiment, are molded in the sleeve part 3, thereby forming undercuts 10 which act in the axial direction as generally seen in FIG. 2.

More specifically, around the periphery of the cover part 4, a number of circumferentially spaced apart hook-shaped projections 9 are molded, for example 4 or 8 projections. The bush part 3 preferably includes a corresponding number of circumferentially spaced apart recesses 11. The projections 9 each engage a respective one of the recesses 11 in the bush part 3. The projections 9 each include an axially extending portion and a radially extending portion, and the recesses 11 each include an axially extending portion and a radially extending portion.

As is apparent from FIG. 2, both the hook-shaped projections 9 and also the recesses 11 are made such that when the projections 9 are clipped, i.e. locked, into the recesses 11, the cylindrical outside contour 6 of the slide bearing bush 1 is largely uninterrupted. That is, the outer diameter of the bush part 3 adjoining the recesses is the same as the outer diameter of the cover part 4 in the end region of the cover part 4 at which the projections 9 are located so that a smooth transition exists from the outer surface of the projections 9 to the outer surface of the bush part 3 in the region adjoining the recesses 11. The axially extending portion of each projection 9 is positioned in the axially extending portion of the respective recess 11, and the radially extending portion of each projection 9 is positioned in the radially extending portion of the respective recess 11 as illustrated in FIG. 2. There can be bevels 13, for example at the intersection of the end face of the bush part 3 and the adjoining circumferential periphery of the bush part 3, to facilitate the mounting process of the parts 3 and 4, i.e. axially slipping the cover part 4 onto the bush part 3 so that the hook-shaped projections 9 can travel more easily into their end positions.

To fix the slide bearing bush 1 on an attachment part, the cover part 4 (or also the bush part 3) can be provided with a mounting flange 12 which is only schematically indicated in FIG. 2.

The individual parts of the slide bearing bush 1 can be relatively easily produced in terms of production engineering in that no special components are necessary in the injection molding tool (folding cores or core pullers). The bush part 3 is formed to include an annular space in the inner periphery of the bush part 3 that is bounded by the bush part. Once the cover part 4 is connected or attached to the bush part, the cover part 4 bounds a part of the annular space to form the groove 5 for receiving the sealing element.

Alternative mounting possibilities of the cover part 4 on the bush part 3 include, by way of example, cementing or screwing-down. In the latter case, the threads are formed radially outside the sealing element 2.

For different sleeve joining (with or without the flange) only the cover part 4 need be changed. Thus a modular structure of the slide bearing bush can be achieved.

The subject matter described here can preferably be applied to slide bearing bushes in which a gasket must be inserted into a groove on the outside diameter of the slide bearing bush for connection to the housing.

The suggested slide bearing bush is especially well suited to relatively maintenance-free slide bearing bushes. Examples include agricultural machinery, such as for example a sowing machine. Moreover the suggested slide bearing bush can also be freely used in some other way.

Preferably the slide bearing bush consists of plastic, one preferred material being polyaryl ketone.

The principles, preferred embodiment and other disclosed aspects of the plain bearing bush have been described in the foregoing specification. However, the invention which is intended to be protected is not to be construed as limited to the particular embodiment and variations disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A slide bearing bush mounted on a shaft, the slide bearing bush possessing a cylindrical outer contour, the slide bearing bush comprising a bush part and a cover part, the bush part being provided with a through hole possessing an inner surface facing an outer periphery of the shaft, the bush part including an annular groove, the cover part being connected to the bush part so that a portion of the cover part bounds the annular groove and defines a wall of the annular groove, a sealing element positioned in the annular groove, the bush part and the cover part each having an outer surface forming a part of the cylindrical outer contour of the slide bearing bush, the cover part being connected to the bush part by at least one projection that engages at least one recess having an undercut, the projection having an axially extending part and a radially extending hooked-shaped part positioned in the recess, the projection and the recess forming a snap connection, the projection having a radial outer surface forming a part of the cylindrical outer contour of the slide bearing bush, the recess having opposing surfaces facing one another, and the cover part comprises a radially outwardly directed mounting flange.

2. A slide bearing bush mounted on a shaft according to claim 1, wherein the projection is integrally formed with the cover part, and the recess is formed in the bush part.

3. Slide bearing bush as claimed in claim 1, wherein the bush part and cover part possesses a cylindrical inside contour.

4. Slide bearing bush as claimed in claim 1, wherein at least the bush part is made of plastic.

5. Slide bearing bush as claimed in claim 1, wherein the bush part and the cover part are made of plastic.

6. Slide bearing bush as claimed in claim 1, wherein the cover part is made of plastic and the bush part is made of metal or a fiber composite or of a combination of these materials.

7. Slide bearing bush as claimed in claim 1, wherein the annular groove receiving the sealing element possesses a rectangular shape in radial cross-section.

8. A slide bearing bush mounted on a shaft, the slide bearing bush possessing a cylindrical outer contour, the slide bearing bush comprising a bush part and a cover part, the bush part being provided with a through hole possessing an inner surface facing an outer periphery of the shaft, the bush part including an annular groove, the cover part being connected to the bush part so that a portion of the cover part bounds the annular groove and defines a wall of the annular groove, a sealing element positioned in the annular groove, the bush part and the cover part each having an outer surface forming a part of the cylindrical outer contour of the slide bearing bush, the cover part being connected to the bush part by at least one projection that engages at least one recess having an undercut, the projection having an axially extending part and a radially extending hooked-shaped part positioned in the recess, the projection and the recess forming a snap connection, the projection having a radial outer surface forming a part of the cylindrical outer contour of the slide bearing bush, and the cover part comprises a radially outwardly directed mounting flange, wherein a first wall of the recess faces a first wall of the radially extending part, a second wall of the recess faces a second wall of the radially extending part and a third wall of the recess faces a third wall of the radially extending part.

9. Slide bearing bush as claimed in claim 8, wherein the first wall of the recess intersects the second wall of the recess and the third wall of the recess.

10. A slide bearing bush mounted on a shaft, the slide bearing bush possessing a cylindrical outer contour, the slide bearing bush comprising a bush part and a cover part, the bush part being provided with a through hole possessing an inner surface facing an outer periphery of the shaft, the bush part including an annular groove, the cover part being connected to the bush part so that a portion of the cover part bounds the annular groove and defines a wall of the annular groove, a sealing element positioned in the annular groove, the bush part and the cover part each having an outer surface forming a part of the cylindrical outer contour of the slide bearing bush, the cover part being connected to the bush part by at least one projection that engages at least one recess having an undercut, the projection having an axially extending part and a radially extending hooked-shaped part positioned in the recess, the projection and the recess forming a snap connection, the projection having a radial outer surface forming a part of the cylindrical outer contour of the slide bearing bush, and the cover part comprises a radially outwardly directed mounting flange, wherein a portion of the outer contour of the bush part is the same radial distance from the shaft as a portion of the outer contour of the cover part.

* * * * *